(12) United States Patent
Jeon

(10) Patent No.: US 8,345,455 B2
(45) Date of Patent: Jan. 1, 2013

(54) DEVICE AND METHOD FOR CONTROLLING HIGH VOLTAGE INVERTER BY USING NEUTRAL POINT

(75) Inventor: Jae Hyun Jeon, Seoul (KR)

(73) Assignee: LS Industrial Systems Co., Ltd., Anyang-si (KR)

( * ) Notice: Subject to any disclaimer, the term of this patent is extended or adjusted under 35 U.S.C. 154(b) by 349 days.

(21) Appl. No.: 12/710,295

(22) Filed: Feb. 22, 2010

(65) Prior Publication Data

US 2011/0050199 A1    Mar. 3, 2011

(30) Foreign Application Priority Data

Aug. 28, 2009   (KR) .................. 10-2009-0080214

(51) Int. Cl.
*H02M 7/48* (2007.01)
*H02M 7/68* (2006.01)
*H02M 7/5387* (2007.01)

(52) U.S. Cl. .............. 363/71; 363/98; 363/132
(58) Field of Classification Search .......... 318/108; 363/50, 55, 56.01–56.04, 56.07, 56.1, 65, 363/71, 95, 98, 131–132
See application file for complete search history.

(56) References Cited

U.S. PATENT DOCUMENTS

| | | | | | |
|---|---|---|---|---|---|
| 5,047,910 | A | * | 9/1991 | Levran et al. | 363/41 |
| 6,151,227 | A | * | 11/2000 | Mizutani et al. | 363/41 |
| 7,508,147 | B2 | * | 3/2009 | Rastogi et al. | 318/376 |
| 2008/0218320 | A1 | * | 9/2008 | Jang | 340/310.12 |
| 2009/0128051 | A1 | * | 5/2009 | Ahn et al. | 315/291 |
| 2009/0237962 | A1 | * | 9/2009 | Yun | 363/37 |
| 2010/0142234 | A1 | * | 6/2010 | Abolhassani et al. | 363/41 |
| 2010/0328848 | A1 | * | 12/2010 | Ledezma et al. | 361/603 |

FOREIGN PATENT DOCUMENTS

| | | |
|---|---|---|
| JP | 2000-060142 | 2/2000 |
| JP | 2002-233180 | 8/2002 |
| JP | 2009-165269 | 7/2009 |
| JP | 2009-183082 | 8/2009 |
| KR | 1020090044126 | 5/2009 |

OTHER PUBLICATIONS

Park et al., "Practical Implementation of PWM Synchronization and Phase-Shift Method for Cascaded H-Bridge Multilevel Inverters Based on a Standard Serial Communication Protocol", IEEE Transactions on Industry Applications, vol. 44, No. 2, Apr. 2008.

* cited by examiner

*Primary Examiner* — Adolf Berhane
*Assistant Examiner* — Jeffrey Gblende
(74) *Attorney, Agent, or Firm* — Lee, Hong, Degerman, Kang & Waimey

(57) ABSTRACT

The present invention relates to a control device and a control method of a high voltage inverter capable of automatically and accurately setting up neutral point information at a master controller and a plurality of cell controllers of the high voltage inverter, wherein a master controller determines information of neutral point set up to itself and performs a communication with the cell controllers each disposed at each of a plurality of U phase unit cells, a plurality of V phase unit cells and a plurality of W phase unit cells to determine the neutral point information preset on the cell controllers and to detect a cell controller set up with neutral point information different from that of the master controller, and to correct the neutral point information of the detected relevant cell controller using the neutral point information set up in the master controller, thereby operating the high voltage inverter.

5 Claims, 4 Drawing Sheets

DEVICE AND METHOD FOR CONTROLLING HIGH VOLTAGE INVERTER BY USING NEUTRAL POINT

CROSS-REFERENCE TO RELATED APPLICATION

The present application claims the benefit of earlier filing date and right of priority to Korean Application Number 10-2009-0080214, filed Aug. 28, 2009, the disclosure of which is incorporated by reference herein in its entirety.

BACKGROUND

The present invention relates to a control device and a control method of a high voltage inverter, and more particularly to a control device and a control method of a high voltage inverter capable of automatically and accurately setting up neutral point information at a master controller and a plurality of cell controllers of the high voltage inverter.

A high voltage inverter generating a high voltage by connecting in series a plurality of unit cells for each phase is basically formed by basically connecting the plurality of unit cells in series. Each one distal end of the plurality of unit cells is connected to form a neutral point, while the other each distal end is connected to a three-phase motor.

A master controller for controlling the operation of the high voltage inverter and each cell controller disposed at each of the plurality of unit cells are set up with the neutral point information. The master controller is configured to control the plurality of unit cells based on the set-up neutral point information. Each cell controller disposed in each of the plurality of unit cells is configured to control a switching operation of each switching element based on the set-up neutral point information to generate a high voltage.

Unless the neutral point information is accurately set up on which position the neutral points are formed in the master controller and the plurality of cell controllers in the high voltage inverter position, the high voltage inverter cannot be normally operated to generate errors such as trip and the like.

Therefore, it is imperative that the neutral point information be accurately set up in the master controller and the plurality of cell controllers.

In setting up the neutral point information, an operator who has installed a high voltage inverter must check a position where the neutral point is formed and set up the neutral point information in the master controller and the plurality of cell controllers.

However, the setting up of neutral point information by an operator suffers from a disadvantage in that it takes lots of time. Another disadvantage is that accurate neutral point information must be set up again by re-checking a connection position of the neutral point if the operator erroneously sets up the neutral point information, which occurs often.

SUMMARY

The present invention provides a control device and a control method of a high voltage inverter capable of accurately and automatically setting up neutral point information by allowing a master controller and cell controllers to intercommunicate, even if an operator erroneously sets up the neutral point information.

Furthermore, the present invention provides a control device and a control method of a high voltage inverter capable of accurately and automatically setting up neutral point information by automatically determining a position where a neutral point is formed, by allowing a master controller and cell controllers to intercommunicate, even if the neutral point information is not set up by an operator.

It should be emphasized, however, that the present invention is not limited to a particular disclosure, as explained above. It should be understood that other technical subjects not mentioned herein may be appreciated by those skilled in the art.

According to a general aspect of the present invention, there is provided a control device of a high voltage inverter, comprising: a phase shift transformer configured to shift phases (R, S, T) of inputted 3-phase voltage to generate a plurality of 3-phase voltages each having a different phase; an inverter configured to switch, by a plurality of U phase unit cells, a plurality of V phase unit cells and a plurality of W phase unit cells, the plurality of 3-phase voltage generated by the phase shift transformer to generate voltages each having a different phase, and to output a 3-phase high voltage to a load by combining the generated voltages of each phase; a plurality of current transformers (CTs) configured to detect a current of each phase outputted to the load by the inverter; and a master controller configured to determine a current level outputted to the load by the inverter using an output signal of the plurality of CTs to control a switching operation of the inverter, wherein the master controller determines self preset neutral point information and performs a communication with cell controllers each disposed at the plurality of U phase unit cells, the plurality of V phase unit cells and the plurality of W phase unit cells and operates the high voltage inverter by allowing the cell controller to be set up with the same neutral point information as the self preset neutral point information.

In some exemplary embodiments, the master controller, if a trip is generated while the high voltage inverter is operated, determines a polarity of a current supplied to a load and a polarity of current outputted by each of the plurality of U phase unit cells, the plurality of V phase unit cells and the plurality of W phase unit cells, and changes the set-up information on the neutral point set up in the master controller and the plurality of cell controllers to operate the high voltage inverter, if the polarity of the current supplied to the load is different from that of each of the plurality of U phase unit cells, the plurality of V phase unit cells and the plurality of W phase unit cells.

In another general aspect of the present invention, there is provided a method of controlling a high voltage inverter, the method comprising: determining, by a master controller, self preset neutral point information; performing, by the master controller, a communication with cell controllers each disposed at the plurality of U phase unit cells, the plurality of V phase unit cells and the plurality of W phase unit cells to determine neutral point information preset in the cell controllers; and detecting a cell controller whose neutral point information is different from the neutral point information set up in the master controller to correct the neutral point information of a relevant cell controller to the neutral point information set up in the master controller, and operating the high voltage inverter.

In some exemplary embodiments, the method of controlling a high voltage inverter may further comprise: selecting, by the master controller, a first output terminal or a second output terminal of the high voltage inverter and setting up one of the first output terminal or the second output terminal as a neutral point if there is no neutral point information pre-set up in the master controller.

In some exemplary embodiments, the method of controlling a high voltage inverter may further comprise: determining if a trip is generated while the high voltage inverter is operated; determining a polarity of a current supplied to a load and a polarity of current outputted by each of the plurality of U phase unit cells, the plurality of V phase unit cells and the plurality of W phase unit cells; and changing the set-up information on the neutral point set up in the master controller and the plurality of cell controllers to operate the high voltage inverter, if the polarity of the current supplied to the load is different from that of each of the plurality of U phase unit cells, the plurality of V phase unit cells and the plurality of W phase unit cells.

In some exemplary embodiments, the method of controlling a high voltage inverter may further comprise: warning a generation of a fault in the high voltage inverter if the polarity of the current supplied to the load coincide with that of each of the plurality of U phase unit cells, the plurality of V phase unit cells and the plurality of W phase unit cells.

In some exemplary embodiments, the method of controlling a high voltage inverter may further comprise: determining whether there is generated a trip if the set-up information on the neutral point set up in the master controller and the plurality of cell controllers is changed to operate the high voltage inverter, and warning a generation of a fault in the high voltage inverter.

BRIEF DESCRIPTION OF DRAWINGS

The unlimiting exemplary embodiments of the control device and control method of a high voltage inverter according to the present invention will be explained in detail hereinbelow together with the accompanying figures. Furthermore, the same reference numerals will be assigned to the same elements in the explanations of the figures.

DETAILED DESCRIPTION

Figure 1:
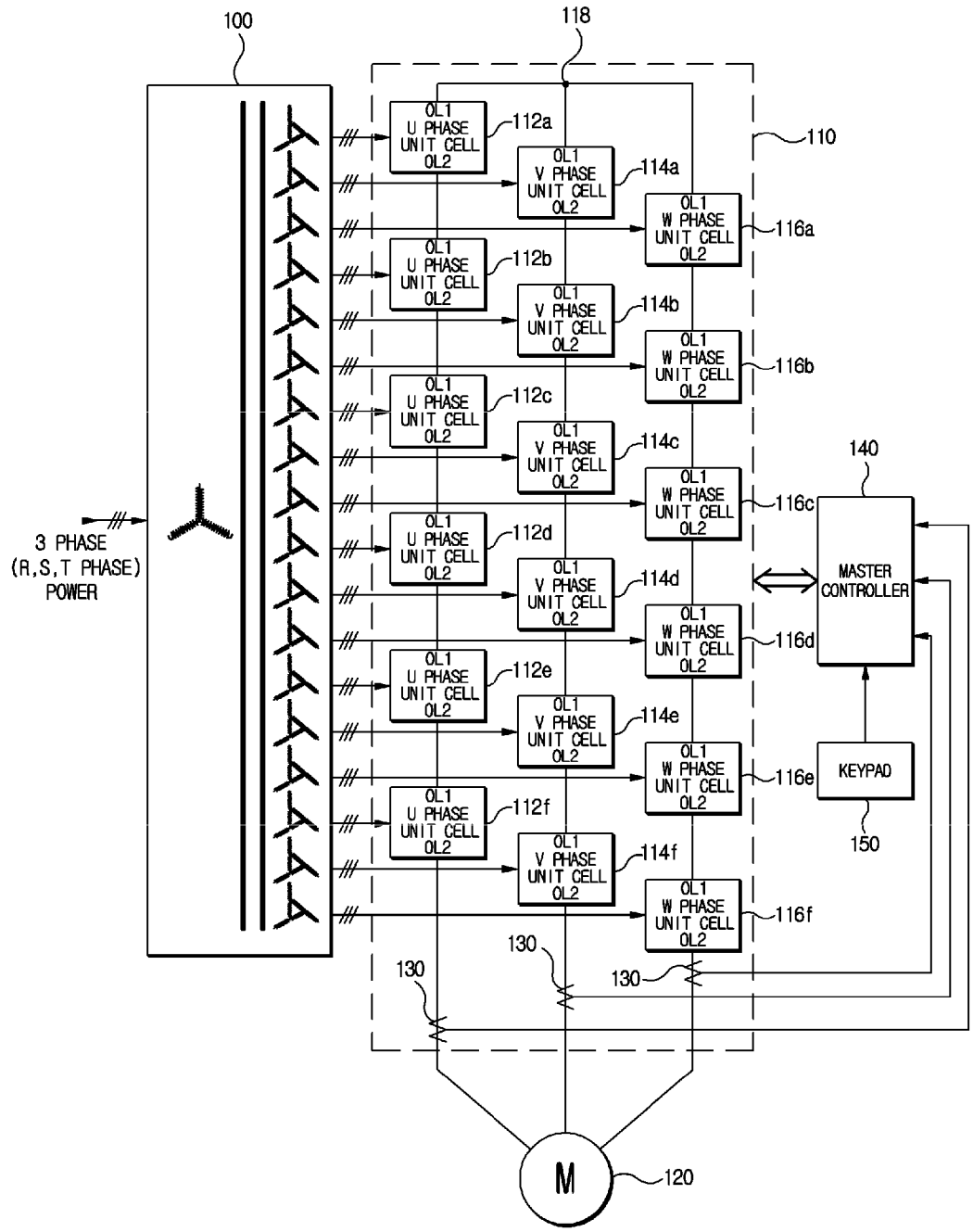
FIG. 1 is a schematic view illustrating configuration of a high voltage inverter applied with a control method according to an exemplary embodiment of the present invention.

Exemplary embodiments of the present invention will be described in detail with reference to the accompanying drawings.

In the drawings, the shapes and relative sizes of constituent elements may be exaggerated for clarity and convenience of explanation. Like numbers refer to like elements throughout. In describing the present disclosure, detailed descriptions of constructions or processes known in the art may be omitted to avoid obscuring appreciation of the invention by a person of ordinary skill in the art with unnecessary detail regarding such known constructions and functions.

FIG. 1 is a schematic view illustrating configuration of a high voltage inverter applied with a control method according to an exemplary embodiment of the present invention, where reference numeral 100 is a phase shift transformer.

The phase shift transformer (100) is configured to shift phases (R, S, T) of inputted 3-phase voltage to generate a plurality of 3-phase voltages each having a different phase. For example, the phase shift transformer (100) shifts the phases (R, S, T) of inputted 3-phase voltage to generate 18 3-phase voltages each having a different phase.

Reference numeral 110 defines an inverter, which converts the plurality of 3-phase voltages of the phase shift transformer (100) to respective direct current (DC) voltages, switches the converted DC voltages in response to a PWM (Pulse Width Modulation) signal to generate a required level of 3-phase voltage.

The inverter (110) may include a plurality of U phase unit cells (112), a plurality of V phase unit cells (114) and a plurality of W phase unit cells (116), each connected in series.

Each of the plurality of U phase unit cells (112), the plurality of V phase unit cells (114) and the plurality of W phase unit cells (116) receives a plurality of 3-phase voltages generated by the phase shift transformer to convert the voltages to DC voltages, switches the converted DC voltages in response to a PWM signal to generate single phase voltages, where the single phase voltages generated by the plurality of U phase unit cells (112), the plurality of V phase unit cells (114) and the plurality of W phase unit cells (116) are overlapped to generate 3-phase high voltages.

For example, the inverter (110) may include 6 U phase unit cells (112: 112a, 112b, 112c, 112d, 112e, 112f), 6 V phase unit cells (114: 114a, 114b, 114c, 114d, 114e, 114f) and 6 W phase unit cells (116: 116a, 116b, 116c, 116d, 116e, 116f)

Each of output terminals (OL2) of the plurality of U phase unit cells (112: 112a, 112b, 112c, 112d, +112e, 112f) is connected in series to each of output terminals (OL1) of the plurality of U phase unit cells (112: 112a, 112b, 112c, 112d, 112e, 112f), each of output terminals (OL2) of the plurality of V phase unit cells (114: 114a, 114b, 114c, 114d, 114e, 114f) is connected in series to each of output terminals (OL1) of the plurality of V phase unit cells (114: 114a, 114b, 114c, 114d, 114e, 114f), and each of output terminals (OL2) of the plurality of W phase unit cells (116: 116a, 116b, 116c, 116d, 116e, 116f) is connected in series to each of output terminals (OL1) of the plurality of W phase unit cells (116: 116a, 116b, 116c, 116d, 116e, 116f).

Furthermore, the output terminal (OL1) of the U phase unit cell (112a), the output terminal (OL1) of the V phase unit cell (114a) and the output terminal (OL1) of the W phase unit cell (116a) are interconnected to form a neutral point (118). The output terminal (OL2) of the U phase unit cell (112f), the output terminal (OL2) of the V phase unit cell (114f) and the output terminal (OL2) of the W phase unit cell (116f) are connected to a load (120) which is a 3-phase motor.

Reference numeral 130 represents a plurality of current transformers (CTs). The plurality of CTs may detect a current of each phase outputted to the load (120) by the inverter (110).

Reference numeral 140 refers to a master controller. The master controller (140) may determine a current level outputted by the inverter (110) to the load (120) using an output signal of the CT (130) to control the switching operations of the plurality of U phase unit cells (112), the plurality of V phase unit cells (114) and the plurality of W phase unit cells (116).

Reference numeral 150 is a keypad. The keypad (150) receives a connection position of the neutral point (118) in response to the operator's manipulation and sets up the neutral point in the master controller (140).

Figure 2:
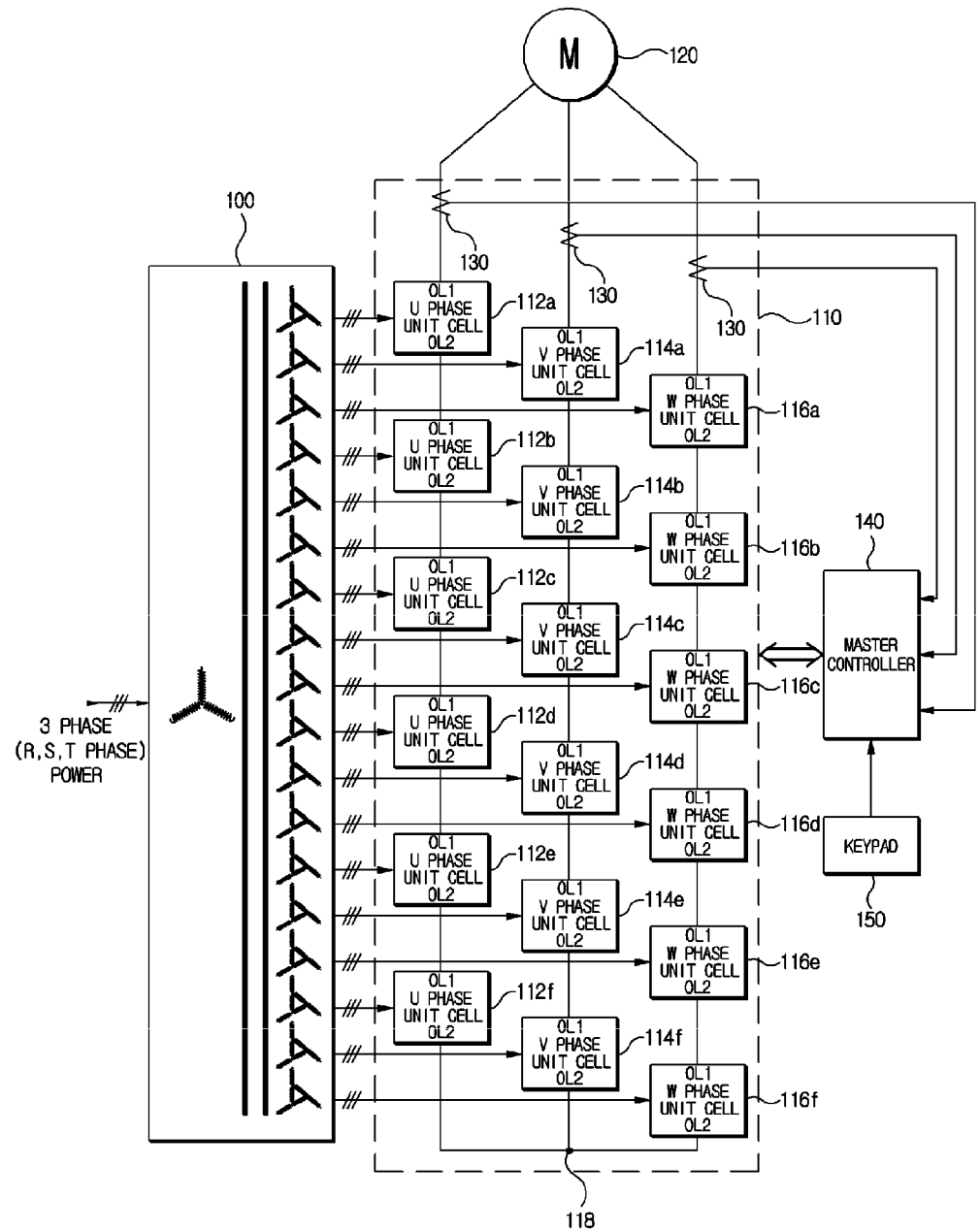
FIG. 2 is a schematic view illustrating another configuration of a high voltage inverter applied with a control method according to an exemplary embodiment of the present invention.

FIG. 2 is a schematic view illustrating another configuration of a high voltage inverter applied with a control method according to an exemplary embodiment of the present invention.

Referring to FIG. 2, the neutral point (118) may interconnect the output terminal (OL2) of the U phase unit cell (112f), the output terminal (OL2) of the V phase unit cell (114f) and the output terminal (OL2) of the W phase unit cell (116f), and may connect the output terminal (OL1) of the U phase unit cell (112a), the output terminal (OL1) of the V phase unit cell (114a) and the output terminal (OL1) of the W phase unit cell (116a) to the load (120) which is a 3-phase motor.

Figure 3:
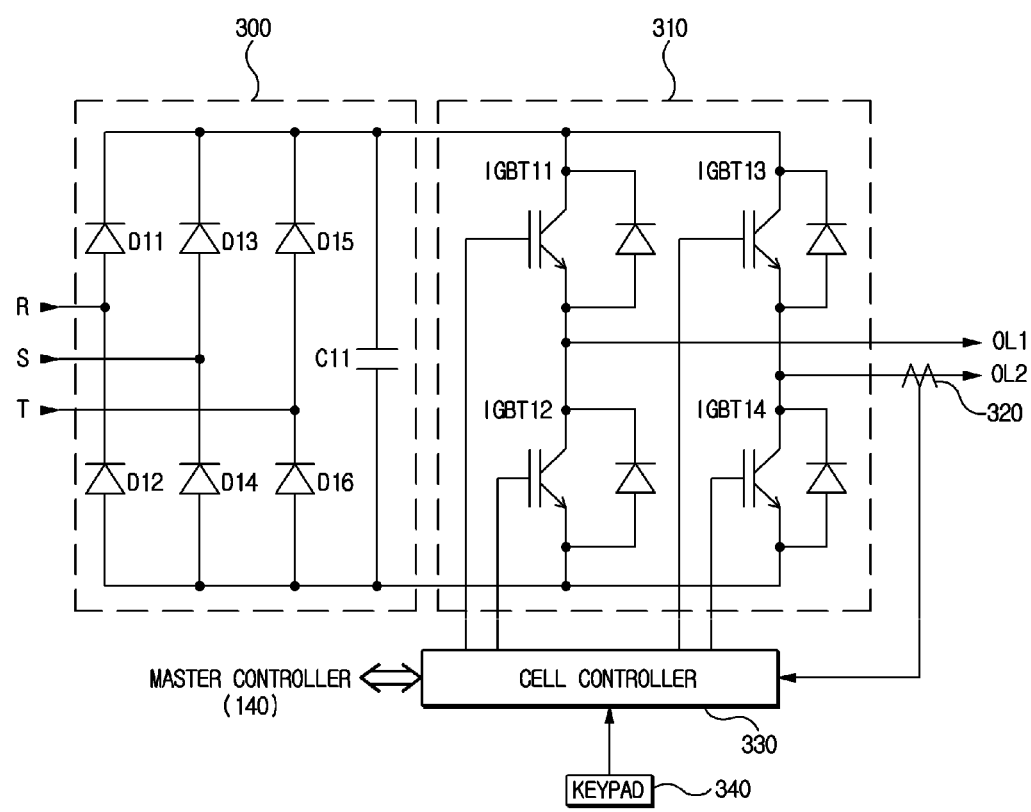
FIG. 3 is a circuit diagram illustrating each configuration of U phase, V phase and W phase unit cells in a high voltage inverter.

FIG. 3 is a circuit diagram illustrating each configuration of U phase, V phase and W phase unit cells in a high voltage inverter.

Reference numeral 300 is a DC voltage converter. The DC voltage converter (300) may include a plurality of diodes (D11 D16) and a smoothing capacitor (C11) and rectify the 3-phase voltage outputted by the phase shift transformer (100) using the plurality of diodes (D11 D16) and smooth using the smoothing capacitor (C11) to generate a DC voltage.

Reference numeral (310) is a switching unit. The switching unit (310) is configured in such a manner that switching elements (IGBT11, IGBT 12) (IGBT13, IGBT 14) are connected in series to two output terminals of the DC voltage converter (300). The serially connected switching elements (IGBT11, IGBT 12) (IGBT13, IGBT 14) repeat the turn-on and turn-off in response to the PWM signal to switch the output voltage of the DC voltage converter (300), whereby a single voltage is outputted to the output terminals (OL1, OL2).

Reference numeral 320 is a CT, which detects a current outputted by the switching unit (310)

Reference numeral 330 is a cell controller performing a communication with the master controller (140), and determines an output current of the switching unit (310) using the output signal of the CT (320) to generate a plurality of PWM signals, and to control the switching operation of the plurality of switching elements (IGBT 11, IGBT 12) (IGBT13, IGBT 14).

Reference numeral 340 is a keypad which receives a connection position of the neutral point (118) in response to the operator's manipulation to set up the neutral point in the cell controller (330).

The high voltage inverter thus configured is operated in such a manner that phases of the 3-phase (R phase, S phase, T phase) voltages inputted from outside are shifted by the phase shift transformer (100) to generate a plurality of 3-phase voltages, each having a different phase.

The plurality of 3-phase voltages generated by the phase shift transformer (100) is inputted to the plurality of U phase unit cells (112), the plurality of V phase unit cells (114) and the plurality of W phase unit cells (116).

Successively, each of the plurality of U phase unit cells (112), the plurality of V phase unit cells (114) and the plurality of W phase unit cells (116) is operated in such fashion that the 3-phase voltages inputted from the phase shift transformer (100) are rectified by a plurality of diodes (D11 D16) to convert to ripple voltages, where the ripple voltages are smoothened by the smooth capacitor (C11) and converted to DC voltages, which are supplied to the switching unit (310) as an operating voltage.

Under this circumstance, the cell controller (330) is operated in response to the control of the master controller (140) while communicating with the master controller (140), determines a current outputted by the switching unit (310) using a detection signal from the CT (320), generates a PWM signal while determining the preset position of the neutral point (108), where the generated PWM signal is transmitted to gates of the switching elements (IGBT11, IGBT 12) (IGBT13, IGBT 14) of the switching unit (310).

Successively, the switching elements (IGBT11, IGBT 12) (IGBT13, IGBT 14) of the switching unit (310) are selectively turned on or turned off in response to the PWM signal to switch the DC voltage outputted by the DC voltage converter (300) for output to the output terminals (OL1, OL2) in a single phase. The single phase voltages outputted by each of the plurality of U phase unit cells (112), the plurality of V phase unit cells (114) and the plurality of W phase unit cells (116) are overlapped to generate U phase, V phase and W phase high voltages, where the generated high voltages are outputted to the load (120), whereby the load (120) is driven.

The cell controller (330) disposed in each of the master controller (140) and the plurality of U phase unit cells (112), the plurality of V phase unit cells (114) and the plurality of W phase unit cells (116) must be accurately set up with the position of the neutral point (118) for the master controller (140) to accurately control the plurality of U phase unit cells (112), the plurality of V phase unit cells (114) and the plurality of W phase unit cells (116), and for the cell controllers (330) each disposed at the plurality of U phase unit cells (112), the plurality of V phase unit cells (114) and the plurality of W phase unit cells (116) to control the switching unit (310), whereby a high voltage can be generated.

Therefore, the master controller (140) and the cell controllers are respectively disposed with keypads (150) (340) to allow the operator to set up an accurate position of the neutral point (118).

However, there have been many cases where the connection position of the neutral point (118) is erroneously set up, whereby the high voltage inverter is operated abnormally to generate a trip. In a case the trip is generated, the operator must re-check the position of the neutral point (118), and manipulates the keypads (150)(340) to re-set up the position of the neutral point (118).

Figure 4:
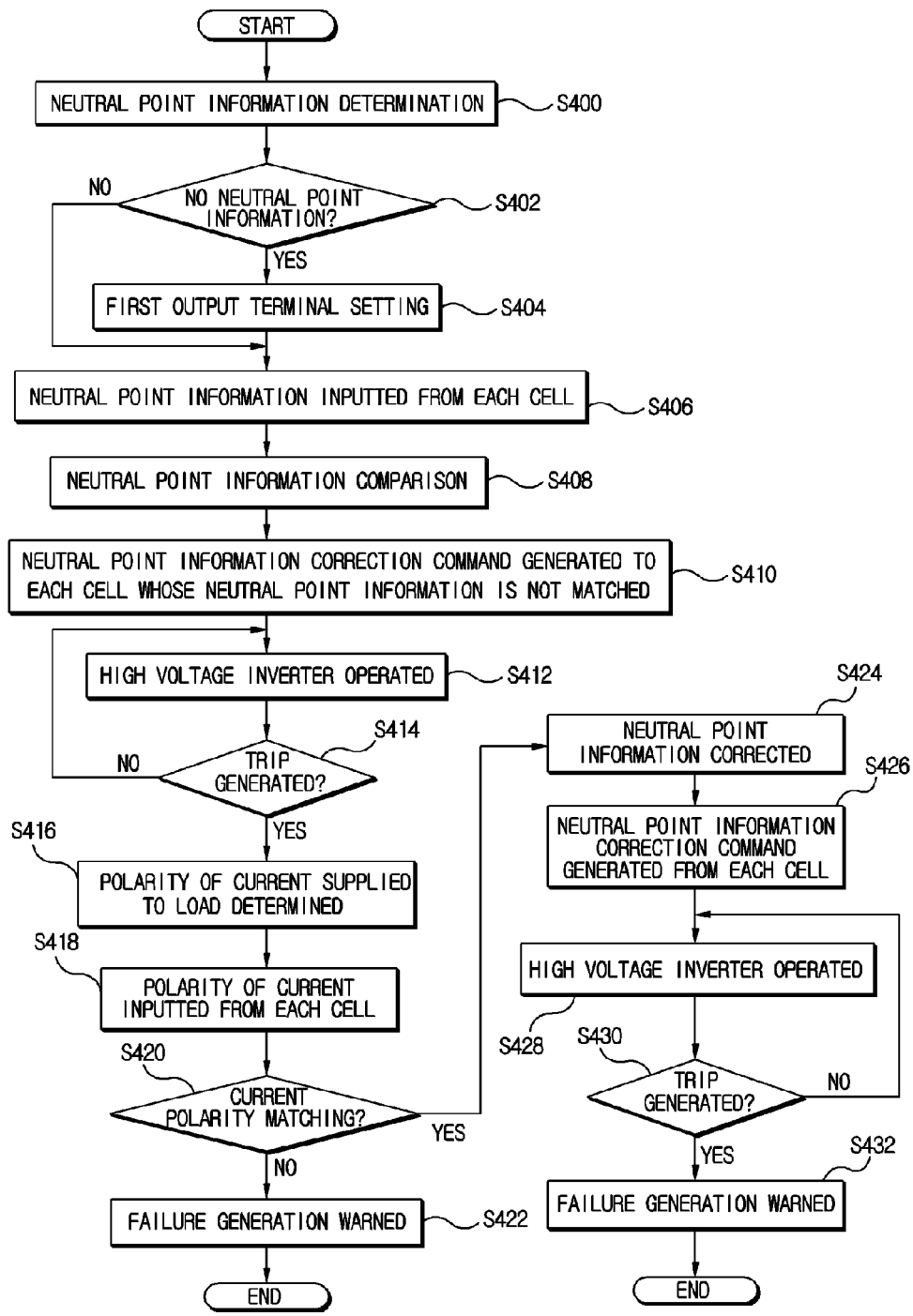
FIG. 4 is a signal flowchart illustrating an operation of a master controller according to a control method of the present invention.

FIG. 4 is a signal flowchart illustrating an operation of a master controller according to a control method of the present invention.

Referring to FIG. 4, the master controller (140) first determines neutral point information set up to itself in advance in operating the high voltage inverter (S400). That is, the master controller (140) determines whether the output terminal (OL1) of the U phase unit cell (112a), the output terminal (OL1) of the V phase unit cell (114a) and the output terminal (OL1) of the W phase unit cell (116a) are set up at the neutral point (118), or the output terminal (OL2) of the U phase unit cell (112f), the output terminal (OL2) of the V phase unit cell (114f) and the output terminal (OL2) of the W phase unit cell (116f) are set up at the neutral point (118).

The master controller (140) determines whether the neutral point information is set up (S402), and sets up the first output terminal of the high voltage inverter at the neutral point (118) if there is no information on the neutral point (S404). That is, the master controller (140) sets up the output terminal (OL1) of the U phase unit cell (112a), the output terminal (OL1) of the V phase unit cell (114a) and the output terminal (OL1) of the W phase unit cell (116a) as the neutral point (118) if no neutral point information is set up.

At this time, the setting up of the neutral point information may be set up by neutral point information of the output terminal (OL2) of the U phase unit cell (112f), the output terminal (OL2) of the V phase unit cell (114f) and the output terminal (OL2) of the W phase unit cell (116f), which are second output terminal of the high voltage inverter.

The master controller (140) communicates with the plurality of cell controllers (330) each disposed at the plurality of U phase unit cells (112), the plurality of V phase unit cells (114) and the plurality of W phase unit cells (116) to input the neutral point information set up at each of the plurality of U phase unit cells (112), the plurality of V phase unit cells (114) and the plurality of W phase unit cells (116).

In a case the neutral point information set up at each of the plurality of U phase unit cells (112), the plurality of V phase unit cells (114) and the plurality of W phase unit cells (116) is received, the master controller (140) compares the neutral point information set up to itself with the neutral point information set up at each of the plurality of U phase unit cells (112), the plurality of V phase unit cells (114) and the plurality of W phase unit cells (116) (S408).

As a result of the comparison, if a correction command is generated on the neutral point information of the cell controller (330) each disposed at the plurality of U phase unit cells (112), the plurality of V phase unit cells (114) and the plurality of W phase unit cells (116) having a different neutral point information from that set up at the master controller (140) to allow neutral point information set up at each cell controller (330) of the plurality of U phase unit cells (112), the plurality of V phase unit cells (114) and the plurality of W phase unit cells (116) to match the neutral point information set up at the master controller (140) (S410).

Under this circumstance, the master controller (140) controls the plurality of cell controllers (330) to activate the high voltage inverter (S412) and to determine whether a trip has occurred on the operating high voltage inverter (S414).

As a result of the determination, if it is determined that there has been generated no trip, it means that the neutral point information has been accurately set up at each of the plurality of cell controllers (330) and the master controller (140), where the master controller (140) continuously operates the high voltage inverter and drives the load (120).

As a result of the determination, if it is determined that there has been generated a trip, it means that the neutral point information has not been accurately set up at each of the plurality of cell controllers (330) and the master controller (140), where the master controller (140) uses the detection signal of the CT (130) to determine the polarity of current supplied to the load (120) (S416)

Furthermore, the master controller (140) communicates with the plurality of cell controllers (330) each disposed at the plurality of U phase unit cells (112), the plurality of V phase unit cells (114) and the plurality of W phase unit cells (116) to input the polarity of current outputted by each of the plurality of cell controllers (330) each disposed at the plurality of U phase unit cells (112), the plurality of V phase unit cells (114) and the plurality of W phase unit cells (116) (S418). That is, the cell controllers (330) input the polarity of current determined by using the detection signal from the CT (320).

In a case the polarity of current outputted by each of the plurality of U phase unit cells (112), the plurality of V phase unit cells (114) and the plurality of W phase unit cells (116) is inputted from the plurality of cell controllers (330), the master controller (140) determines whether the polarity of current detected by using the detection signal of the CT (130) matches that inputted from the plurality of cell controllers (330) (S420).

As a result of the determination, if it is determined that polarities are matched, the master controller (140) generates a warning to end the operation, because it means that other failures than the accurate setting of the neutral point (118) have been generated.

As a result of the determination, if it is determined that polarities are not matched, the master controller (140) corrects the neutral point information set up to itself, because it means that the neutral point (118) is not accurately set up (S424).

That is, the master controller (140) correctly sets up the output terminal (OL2) of the U phase unit cell (112f), the output terminal (OL2) of the V phase unit cell (114f) and the output terminal (OL2) of the W phase unit cell (116f) as neutral point (118), if the output terminal (OL1) of the U phase unit cell (112a), the output terminal (OL1) of the V phase unit cell (114a) and the output terminal (OL1) of the W phase unit cell (116a) are set up as the neutral point (118).

Furthermore, the master controller (140) correctly sets up the output terminal (OL1) of the U phase unit cell (112a), the output terminal (OL1) of the V phase unit cell (114a) and the output terminal (OL1) of the W phase unit cell (116a) as neutral point (118), if the output terminal (OL2) of the U phase unit cell (112f), the output terminal (OL2) of the V phase unit cell (114f) and the output terminal (OL2) of the W phase unit cell (116f) are set up as neutral point (118).

The master controller (140) communicates with the plurality of cell controllers (330) to generate a correction command to correct the neutral point information (S426).

If all the neutral point information is corrected, the master controller (140) reactivate the high voltage inverter (S428) to determine if the trip has been generated while the high voltage inverter is under operation (S430).

As a result of the determination, if it is determined that the trip has not been generated while the high voltage inverter is under operation, the master controller (140) keep operating the high voltage inverter to drive the load (120), because it means that the master controller (140) and each of the plurality of cell controllers (330) are set up with an accurate position of neutral point (118).

As a result of the determination, if it is determined that the trip has been generated while the high voltage inverter is under operation, the master controller (140) generates a warning to end the operation, because it means that other failures than the accurate setting of the neutral point (118) have been generated.

As described above, the control device and the control method of a high voltage inverter according to the present invention automatically correct the wrong set-up of neutral point information, if wrong neutral point information is set up on the master controller and each cell controller of the plurality of U phase unit cells, the plurality of V phase unit cells and the plurality of W phase unit cells.

Therefore, it is possible to prevent the trip caused by wrong set-up of neutral point information during operation of the high voltage inverter, and the operator needs no manual set-up of neutral point on each of the cell controllers disposed on the master controller and each of the plurality of U phase unit cells, the plurality of V phase unit cells and the plurality of W phase unit cells by manipulating the keypad.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A control device of a high voltage inverter, the control device comprising:

a phase shift transformer configured to shift phases (R, S, T) of received 3-phase voltage in order to generate a plurality of 3-phase voltages each having a different phase;

an inverter configured to switch the generated plurality of 3-phase voltages in order to generate voltages each having a different phase and to output a 3-phase high voltage to a load by combining the generated voltages of each phase, the generated plurality of 3-phase voltages switched by a plurality of U phase unit cells, a plurality of V phase unit cells and a plurality of W phase unit cells;

a plurality of current transformers (CTs) configured to detect a current of each phase output to the load by the inverter; and a master controller configured to:
- determine a current level output to the load by the inverter using an output signal of the plurality of CTs in order to control a switching operation of the inverter;
- determine whether first output terminals of each of the plurality of U phase unit cells, each of the plurality of V phase unit cells and each of the plurality of W phase unit cells are set UP at a preset neutral point;
- perform a communication with a cell controller disposed at each of the plurality of U phase unit cells, each of the plurality of V phase unit cells and each of the plurality of W phase unit cells;
- operate the inverter by allowing each cell controller to be set up with a same neutral point as the preset neutral point;
- determine a polarity of a current supplied to a load and a polarity of current output by each of the plurality of U phase unit cells, each of the plurality of V phase unit cells and each of the plurality of W phase unit cells if a trip is generated while the inverter is operated, and
- change the neutral point set up in the master controller and each cell controller in order to operate the inverter if the polarity of the current supplied to the load is different from the polarity of the current output by each of the plurality of U phase unit cells, each of the plurality of V phase unit cells and each of the plurality of W phase unit cells.

2. A method of controlling a high voltage inverter, the method comprising:

determining, by a master controller, preset neutral point information;

performing, by the master controller, a communication with a cell controller disposed at each of a plurality of U phase unit cells, each of a plurality of V phase unit cells and each of a plurality of W phase unit cells in order to determine neutral point information preset in the cell controllers; and detecting one of the cell controllers whose neutral point is different from a neutral point set up in the master controller in order to correct the neutral point of a relevant cell controller to the neutral point set up in the master controller;

operating the high voltage inverter;

determining whether a trip is generated while the high voltage inverter is operated;

determining a polarity of a current supplied to a load and a polarity of current output by each of the plurality of U phase unit cells, each of the plurality of V phase unit cells and each of the plurality of W phase unit cells; and changing the neutral point set UP in the master controller and each cell controller in order to operate the high voltage inverter if the polarity of the current supplied to the load is different from the polarity of the current output by each of the plurality of U phase unit cells, each of the plurality of V phase unit cells and each of the plurality of W phase unit cells.

3. The method of claim 2, further comprising:
selecting, by the master controller, a first output terminal or a second output terminal of the high voltage inverter; and
setting up the selected first output terminal or second output terminal as a neutral point if there is no neutral point pre-set in the master controller.

4. The method of claim 2, further comprising warning a generation of a fault in the high voltage inverter if the polarity of the current supplied to the load coincides with of the polarity of the current output by each of the plurality of U phase unit cells, each of the plurality of V phase unit cells and each of the plurality of W phase unit cells.

5. The method of claim 2, further comprising warning a generation of a fault in the high voltage inverter.

* * * * *